United States Patent

Wainer

[15] 3,706,673
[45] Dec. 19, 1972

[54] AQUEOUS COMPOSITION FOR DEPOSITING PHOSPHORS

[72] Inventor: Eugene Wainer, Cleveland, Ohio

[73] Assignee: Horizons Incorporated, a Division of Horizons Research Incoroprated

[22] Filed: Feb. 12, 1971

[21] Appl. No.: 155,662

Related U.S. Application Data

[62] Division of Ser. No. 826,704, May 21, 1969, Pat. No. 3,597,259.

[52] U.S. Cl. .............252/501, 252/301.6 S, 23/134, 23/135
[51] Int. Cl. ............................H01c 7/08, C09k 1/12
[58] Field of Search ........252/501, 301.2 R, 301.3 R, 252/301.6 R, 301.6 S; 117/33.5 R, 33.5 C, 34; 23/135, 134; 106/292, 293, 301

[56] References Cited

UNITED STATES PATENTS

| | | | |
|---|---|---|---|
| 3,592,643 | 7/1971 | Bartfai | 96/1.5 |
| 2,173,895 | 9/1939 | Booge | 106/301 X |
| 3,127,282 | 3/1964 | Hershinger | 117/33.5 C |
| 3,347,693 | 10/1967 | Wendland | 117/33.5 C |
| 3,466,190 | 9/1969 | Yamashita et al. | 252/501 X |

Primary Examiner—Charles E. Van Horn
Attorney—Lawrence I. Field

[57] ABSTRACT

The preparation of phosphors such as those based on zinc sulfide and/or cadmium sulfide in the form of very fine particles which include not only the sulfide but also the activator and mineralizer required to make this an active material and the deposition of such an active material from a clear solution containing the phosphor, mineralizer and dopant necessary to complete an active material, into the pores of a suitable substrate, thereby producing the essential element for a high resolution information retrieval transducer.

4 Claims, No Drawings

AQUEOUS COMPOSITION FOR DEPOSITING PHOSPHORS

This application is a division of application Ser. No. 826,704 filed May 21, 1969 issued Aug. 3, 1971 as U.S. Pat. No. 3,597,259.

Phosphors and phosphor type materials have broad applications for visualizing the effects of cathode rays, electron beams, x-rays, ultraviolet light, and further may be utilized in such phenomena as electroluminescence, electroquenching, light amplifiers and light storage devices as has been defined previously. The class of phosphors taken from the group of the sulfide, selenide and telluride compounds of zinc or cadmium or combinations of zinc and cadmium, doped in various manners not only are used in all of the foregoing applications but when doped in a specific manner are also useful as photoconductors.

Chemically, the base material for a large variety of presently known phosphors is comprised of well crystallized varieties of the sulfides of zinc or cadmium and mixtures thereof properly doped. These doping agents are sometimes called "activators" and "coactivators." Depending on their chemical construction, the phosphor may act principally as the material which gives off light when struck with either electromagnetic radiation or electrons or the material may act as a photo-conductor. Actuators which are acceptors of electrons may consist of one or more elements or compounds which may be chosen from the group 1–B elements or the group V–B elements. By 1–B elements, are usually meant copper, silver, and gold. By V—B elements are usually meant phosphorus, arsenic and antimony. Similarly, a coactivator which is a donor of electrons may be added in lieu of or in addition to the activator. The coactivator is preferably one or more elements from the group III–B or group VII–B, group III–B consisting of the elements of aluminum, gallium and indium, whereas group VII–B consists of the elements of chlorine, bromine and iodine. These various activators and coactivators may be provided as elements or as compounds. In some cases, a single compound, for example copper chloride, may furnish both an activator (copper) and a coactivator (chlorine). When the doping is carried out principally by an activator the material tends to act as a phosphor and when the doping is carried out principally with a coactivator the material tends to act as a photoconductor. The amount of doping or activating agent placed in the crystal is generally in the range of 0.02 to 0.3 percent by weight of the host metal sulfide.

When the material is intended for use as a phosphor generally it must be well crystallized and the activators and/or coactivators must be an intimate part of the crystal structure. When the material is intended for use as a photoconductor the high degree of crystallization is not usually necessary and in many cases good photoconductors are found when the crystallized size is of the order of 0.1 micron or very much less. The usual practice for insuring adequate crystallization of both the phosphor and the photoconducting variety of this class of compounds is to heat treat the respective purified sulfides in the presence of the various desired activators and/or coactivators in a fused salt bath, generally comprised of alkali halides or mixtures thereof, at temperatures in the range of 800° to 1,000° C. and to maintain this treatment for a considerable time. The phosphor is recovered by leaching out the soluble alkali halide in water and a well crystallized rather coarse variety of crystal is obtained.

The procedure by which phosphor particles are made in a fused salt menstruum such as mixtures of alkali halides may be referred to as the "traditional" technique. Products made by this procedure are, as indicated previously, well crystallized and the particle size is quite coarse, in the range of several microns, in order to obtain high luminescence efficiency. If these coarse luminescent crystals are examined under a high powered microscope under conditions such that the phosphor powder is illuminated only by non-visible ultraviolet light focused on top the stage, it is seen that the source of light is such coarse crystals represents a very small portion of the total crystal indicating that the light comes from a specific active center very much smaller than the size of the host. Obviously, the efficiency of luminescence might be increased radically if the crystal consists entirely of active centers rather than a combination of active and dead portions.

A number of techniques have been developed, therefore, to enable phosphors to operate either as luminescent materials or as electroluminescent materials in very thin layers. One of these techniques involves simultaneous evaporation of the base material plus an activator from separate boats to yield an active layer of the order of 3 microns in thickness. This procedure is described in U.S. Pat. No. 3,113,040. In order to produce a luminescent material zinc sulfide and metallic copper are simultaneously evaporated onto a clean glass surface. A variation of the procedure is to evaporate zinc sulfide powder which has been previously treated to contain 0.15 percent copper, 0.1 percent chlorine and 0.02 percent zinc oxide. Again an active layer at a thickness of 3 microns is obtained. Highly efficient electroluminescence is obtained when such film is placed in an electric field, providing the evaporation is made onto a substrate of conductive glass. Other workers have found that when activated with a mixture of copper and chlorine, evaporated zinc sulfide film thicknesses of the order of 1 micron showed high brightness efficiency even at low voltages and particularly in an alternating field.

Variations of this procedure have been utilized to make evaporated layers active for such applications as luminescence, electroluminescence, cathode luminescence, and the like as defined in U.S. Pat. No. 3,127,282. In this case the base phosphor layer is the sulfide, selenide or telluride of zinc or cadmium or combinations of zinc and cadmium. It has been found that simple evaporation of any of these compounds usually produces phosphor layers of low brightness efficiency. If, however, this thin evaporated layer is then heat treated in an atmosphere comprising the chloride, bromide or fluoride of either zinc or cadmium in the presence of oxygen the efficiency of light emission is greatly improved. In the case of zinc chloride, air is passed over zinc chloride heated to 475° C. at reduced pressure and the atmosphere thus created contacts the phosphor layer also maintained at this temperature. Improved results are obtained if the operation is carried out at reduced pressure in the presence of pure oxygen. Depending on the various combinations of salts, pressure and the like, the activation to produce high efficiency light output in very thin layers may be carried out at temperatures as low as 290° C. The significance of the finding with regard to heat treatment in this halide atmosphere is that the same improvement in efficiency is obtained whether the base phosphor is evaporated or placed on the substrate by settling of preformed grains.

In a variation of this procedure (U.S. Pat. No. 3,347,693) an exceptional increase in brightness was found by utilizing cadmium chloride not only as a flux but as a means of introducing activator into already preformed surfaces whether these surfaces were prepared by evaporation or from presettled grains. Normally, the luminous efficiencies of settled powdered surfaces are of the order of 15 percent whereas the usual film deposited by evaporation has an efficiency of the order of 1 percent. Films deposited by simultaneous evaporation exhibit a brightness of approximately one-fifth that obtained from settled powders. However, the technique of simultaneous evaporation is not usually found to be too effective for zinc cadmium sulfide phosphors which have been doped with silver, this composition being the normal one used for conventional television screens. In the procedure described in the above U.S. patent a layer of cadmium chloride is first laid down on the substrate which is then covered with an evaporated layer of cadmium sulfide. An extremely thin film of silver is then laid down on the cadmium sulfide after which the composite is heated in a nitrogen atmosphere for a few minutes at 500° C. Zinc sulfide is then evaporated over the silver film and the film composite is again then heated in nitrogen at 500° to 550° C. It is presumed that this composite method of operation, followed by the subsequent heat treatment permits the cadmium chloride to act as a flux for the introduction of the silver activator. The conversion efficiency to light through the use of electron beams with such a film is about 20 percent yielding a figure of about 5 times greater than that available from other evaporating procedures. For example, for a specific beam current the brightness output for the normally non-flux heat treated type of evaporated surface is about 50 foot lamberts, whereas when treated in the manner in accordance with the description just given the brightness output is around 800 foot lamberts at the same beam current.

Consideration of this extremely small portion of the total prior art indicates that high brightness output efficiencies can be anticipated in extremely thin films, thin enough to be transparent, and of thicknesses of 1 micron or less, providing proper attention is placed on utilization of not only the proper concentration of activator but means for placing the activator in the host crystal so substantially all of the host crystal operates as an activated particle in contrast to the output of coarse crystals made by fusion treatment techniques where only a small portion of the crystal appears to be activated.

These techniques are of particular interest relative to the problem of producing high brightness efficiency or other phosphor efficiencies for materials placed in extremely small holes where the average particle size in such holes will be substantially less than 1 micron.

However, it has been found that once the sulfides, generally along with the desired activator and/or coactivator are made available even in submicroscopic size and not necessarily well crystallized and with the doping agents already incorporated in the crystal, that heat treatment of this nonactive submicroscopic size material in an atmosphere of the halide of one of the base constituents with or without the presence of oxygen or other gaseous diluents, then the desired crystallization can be made to take place at very much lower temperatures with insurance that the doping agent is properly incorporated in the crystal. Under these conditions crystallization can be made to take place well below 600° C. and in some cases as low as 280° C., yielding materials which have properties comparable to those which are normally made at much higher temperatures.

When phosphors are deposited on suitably receptive substrates, one of the most popular techniques presently employed involves the deposition of sulfides, followed by the addition of a mineralizer to the sulfide and finally the addition of a doping agent. In procedures of this type it will be evident that the dopant and mineralizer are unable to completely penetrate the sulfide and are only capable of acting on the surface of the sulfide and possibly to a very limited extent on those portions of the sulfide immediately below the surface.

When the substrate upon which the phosphor is deposited comprises thousands of passageways or channels of microscopic or submicroscopic diameter, e.g., when the substrate is porous, the problem is even more acute because the sulfide fills the pores and the mineralizer and dopant can reach only the top of the sulfide.

One aspect of the present invention relates to the preparation of phosphors, activated and crystallized in a manner which insures that the total crystal is activated rather than some small portion thereof.

Another aspect of the invention resides in a technique for placing suitably activated phosphor material in the extremely small pores of specially prepared substrates, which may then be constructed into useful devices by attachment of electrodes and other required fabricating procedures.

Briefly it has been found that compounds of the host materials, especially compounds of zinc and cadmium can be prepared in the form of clear solutions by utilization of thiosulfates (dithionates) and that this is also true of the preferred activators such as copper, silver, gold and other noble metals. Instead of the thiosulfates, it is also possible to use selenosulfates or tellurosulfates instead of the more readily available thiosulfates. Further, it has been found that these solutions are compatible with an excess of the halides of zinc and/or cadmium. Further, these thiosulfates or dithionate type compounds are generally quite soluble in weak alkali, neutral, or weak acid solutions without the need for complexing. When these materials do not have the desired solubility properties in their simple form (i.e., uncomplexed) their solubility may be grossly increased by adding the comparable alkali salt as, for example, sodium thiosulfate. In many applications, the presence of sodium salts may be considered deleterious in view of its chemical action on the host material in any subsequent heat treating step. To a limited extent, the sodium thiosulfate may be replaced with ammonium thiosulfate but the thiosulfate of the strong base, triphenylmethyl ammonium hydroxide is found to be a preferred substitute in place of the comparable alkali thiosulfate. Not only does the organic thiosulfate duplicate the chemical properties of the alkali sulfate but in subsequent heat treatment it is eliminated by decomposition and evaporation and does not have a deleterious effect on the host material or on substrates such as alumina, glass or the oxides of metals, to which the phosphor may be applied. Conversely, the stability of the solutions and facilitation of decomposition to sulfides is also aided by the addition of a weak acid, such as acetic, providing an ample supply of ammonium thiosulfate is present.

The present invention utilizes the capability for placing in clear solution not only the compounds of zinc and cadmium but along with them the compounds of copper, silver, and a large number of other metals which may be utilized as activators, along with an excess of the chlorides of the host material so that the essential ingredients as a phosphor or photoconductor based on such materials are available as a single dissolved solution bath. Further, these compounds may be placed in the desired anion form with the triphenylmethyl ammonium hydroxide through the formation of the complex indicated, thus insuring a very active adsorption on the active aluminum oxide surface which is produced by anodizing of aluminum metal. On heating up to temperatures usually not exceeding 200° C. and in many cases as low as 100° C., these salts decompose to their respective sulfides, selenides or tellurides. Under proper conditions the decomposition is quantitative. In the majority of cases this decomposition takes place readily by heating in nitrogen to prevent oxidation of the respective sulfide compound. In some cases, the formation of the desired sulfide is enhanced both with respect to speed and efficiency by mixing hydrogen sulfide with the nitrogen atmosphere.

Thus, by following the teachings of this invention, not only can the sulfide be formed in dry state by thermal decomposition of the thiosulfates under mild conditions but the parent material can be placed in solution in stable manner to insure the proper placement of the sulfide in the desired area. Most importantly, however, is the capability for including in the original soluble salt mixture the proper concentration of activator elements, thus insuring complete efficiency of activation in the proper concentration and placement in the host crystal on an atomic scale. Also, preparation in this manner will permit activation of 100 percent of the material thus eliminating the particle size limitations of phosphors prepared by the techniques of either heat treatment and flux or even by evaporation.

Although the preferred practice of this invention is directed to placement of such materials in a channel matrix (primarily for the elimination of crosstalk, such crosstalk representing a limitation on resolution), it is also feasible to utilize a similar procedure for making extremely thin flat films of the material on standard substrates for standard applications as, for example, a television screen. This would eliminate the expensive and time consuming process of evaporation and complicated heat treatment which thus far is the best approach for obtaining a high resolution output in a cathode ray tube screen.

The following examples are intended to illustrate a preferred embodiment of the present invention and are not to be construed as limiting the same.

EXAMPLE 1

An aluminum oxide wafer is first prepared by anodizing an aluminum sheet, e.g., by procedures well known in the art and summarized on pages 216 and 217 of the book entitled "Finishing of Aluminum" by S. Wernick and R. Pinner published in 1959 by Robert Draper Ltd., London. By operating according to such known procedures an aluminum oxide film of about 50 microns thickness may be produced on the base aluminum sheet.

Thereafter the pores in the anodized layer are enlarged from initial pore sizes of about 0.03 microns to pore sizes of between 0.1 and 0.4 microns, and with an open (pore) to closed (sheet) ratio between 20 and 70 percent, by etching the aluminum oxide film. A preferred procedure produces a surface with an open to closed ratio of about 50 percent, pore sizes of about 0.2 microns in a layer thickness of about 50 to 60 microns. When properly prepared, this layer will withstand a potential difference across its parallel plane faces of approximately 2,000 volts.

The oxide film is then stripped from the aluminum substrate on which it was formed, by immersion in a concentrated solution of mercuric chloride, as described, for example, on page 413 of the Journal of the Electrochemical Society, Vol. 100, No. 9, September 1953.

After rinsing and drying the wafer so prepared, the pores were impregnated with a clear solution containing the following:

200 cc's distilled water
60 g ammonium thiosulfate (range 30 to 100 g)
15 g zinc thiosulfate (range 1 to 30 g)
5 g cadmium chloride (range 0.5 to 10 g)
25 g cadmium thiosulfate (range 5 to 50 g)
0.1 g silver thiosulfate and/or 0.4 g copper thiosulfate.

While non-acid or non-alkali containing solutions can be used, useful modifications imparting greater stability to such forming solutions may be imparted by adding either (1) glacial acetic acid in an amount ranging between 5 cc's and 20 cc's per 200 cc's of the water content or (2) a 50 percent water solution of triphenylmethyl ammonium hydroxide in an amount ranging from 5 cc's to 50 cc's per 200 cc's of the water content. Not only is solution stability imparted by these additions but the decomposition to sulfides as defined in later steps is facilitated.

After immersion for about 3 minutes, the impregnated wafer was dried at about 80° C. for 20 minutes, permitting the salts trapped in the pores to crystallize in the pores.

The so prepared wafer was then heat treated in an atmosphere comprising $H_2S$ (10 percent) and $N_2$ (90 percent) at 200° C. for 10 minutes, after which the wafer was permitted to cool to room temperature. As a result of the above treatment the pores were impregnated with a mixture of sulfides, throughout which both a dopant and mineralizer were uniformly dispersed. The particle size of the sulfides made in this manner was between 50 and 100 angstrom units.

The wafer was then immersed in the above solution of mixed thiosulfates for a second time and the procedure of impregnating, crystallizing, heat treating, and cooling was repeated one or more times depending on how completely the pores are to be filled. Two cycles result in a pore volume filling of between about 75 to 80 volume percent. Each additional cycle adds to the extent of filling.

At the conclusion of the last cooling step, the wafer was soaked in a 5 percent solution of cadmium chloride in water for 2 minutes. The surface was wiped and permitted to dry in air. Then the wafer was given a further heat treatment in an atmosphere consisting of $H_2S$ (10 percent) and $N_2$ (90 percent) at temperatures between 500 and 550 degrees C. for 20 minutes.

After cooling, the wafer was ready for incorporation into an appropriate energy conversion device.

EXAMPLE 2

The procedure of Example 1 was repeated, except that air under a reduced pressure of between 5 and 20 mm of mercury was used in the final heat treating step.

Once the completed phosphor has been deposited on a suitable substrate or in the pores of a porous substrate, as indicated in the preceding description, various kinds of high resolution devices can be prepared from the resulting products; usually by fabricating techniques already known in the art. Some of these devices include, for example, the following:

cathode ray tube devices using high voltages or low voltages;
night vision devices; and
electroluminescent devices.

A high resolution electron beam device can be prepared by impregnating the pores of various wafers as described above and using the resulting product as the face of a cathode ray tube.

Or, metallic electrodes may be evaporated onto both planar faces of a phosphor filled wafer and the resulting product can be coated on one face with glass and then electroded and sealed into a cathode ray tube, preferably a low voltage tube.

The phosphor filled wafers could be coated with Al or Au by evaporation and then encased in glass after suitable electrical leads had been attached. The encapsulating glass is one which is known to transmit in the infrared. The device is then susceptible to activation in the near and far infrared for use as a night illuminator.

Again the phosphor impregnated or coated wafers prepared as described above could be used in electroluminescent devices.

The invention is therefore applicable to a vast number of useful devices and it is not intended that it be limited except as may be required by the appended claims.

I claim:

1. A clear aqueous solution from which phosphors may be deposited onto porous or non-porous substrates comprising:

at least one phosphor forming compound of at least one element selected from the group consisting of zinc, cadmium and mixtures of zinc and cadmium, said compound having an anion selected from the group consisting of thiosulfates, selenosulfates, tellurosulfates, dithionates, diselenates and ditellurates;

at least one compound of an activator element selected from the group consisting of copper, silver, gold and the other noble metals, said compound having the same anion as said phosphor forming compound;

at least one halide of a metal selected from the group consisting of zinc, cadmium and mixtures of zinc and cadmium;

and including in addition a complexing agent selected from the group consisting of ammonium thiosulfate, ammonium selenosulfate, ammonium tellurosulfate, the thiosulfate of triphenyl methyl ammonium hydroxide, the selenosulfate of triphenyl methyl ammonium hydroxide and the tellurosulfate of triphenyl methyl ammonium hydroxide.

2. The solution of claim 1 wherein the complexing agent is triphenyl methyl ammonium hydroxide.

3. The solution of claim 1 wherein the phosphor forming compounds and the activator compounds are both thiosulfates.

4. The solution of claim 3 including in addition acetic acid.

* * * * *